United States Patent
Tang et al.

(10) Patent No.: US 9,002,743 B2
(45) Date of Patent: Apr. 7, 2015

(54) METHOD, SYSTEM AND SERVER FOR MANAGING DATA TRANSMISSION

(75) Inventors: Mu Tang, Shenzhen (CN); Yan Chen, Shenzhen (CN); Yan Zhao, Shenzhen (CN); Songtao Lin, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 1408 days.

(21) Appl. No.: 11/792,614

(22) PCT Filed: Dec. 9, 2005

(86) PCT No.: PCT/CN2005/002138
§ 371 (c)(1),
(2), (4) Date: Aug. 24, 2007

(87) PCT Pub. No.: WO2006/060963
PCT Pub. Date: Jun. 15, 2006

(65) Prior Publication Data
US 2008/0109511 A1     May 8, 2008

(30) Foreign Application Priority Data
Dec. 9, 2004   (CN) .......................... 2004 1 0077437

(51) Int. Cl.
    *G06F 21/10*     (2013.01)
    *H04L 29/08*     (2006.01)

(52) U.S. Cl.
    CPC ................ *G06F 21/10* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 6,314,408 | B1* | 11/2001 | Salas et al. ...................... | 705/54 |
| 6,868,403 | B1* | 3/2005 | Wiser et al. ..................... | 705/51 |
| 2002/0049844 | A1 | 4/2002 | Nishikawa | |

(Continued)

FOREIGN PATENT DOCUMENTS

| CN | 1450766 A | 10/2003 |
|---|---|---|
| CN | 1492627 A | 4/2004 |

(Continued)

OTHER PUBLICATIONS

Chinese Office Action for Chinese Patent Application No. 2004100774371, dated May 25, 2007, and English translation thereof.

(Continued)

*Primary Examiner* — Tsan-Yu J Huang
(74) *Attorney, Agent, or Firm* — Harness, Dickey & Pierce, P.L.C.

(57) ABSTRACT

Method, system and server for managing data transmission. The method comprises the following steps: the first client requests the server for data update; the server analyzes the request of the first client and takes the control measurement to the data that the client requests to update according to the predetermined control policy, and performs the subsequent process after the data requested by the client meet the control policy; the server informs the first client to update the data; the first client updates the data; the server informs the second client that the data of the first client has been updated; the second client acquires the updated data. The present invention discloses also a control system and a control equipment achieving the above method. The server takes the unified central control notification mode according to the present invention to effectively control the propagation approach of the personalized data.

9 Claims, 7 Drawing Sheets

(56) References Cited

U.S. PATENT DOCUMENTS

| | | | |
|---|---|---|---|
| 2002/0069176 A1* | 6/2002 | Newman | 705/53 |
| 2002/0112171 A1* | 8/2002 | Ginter et al. | 713/185 |
| 2002/0138441 A1* | 9/2002 | Lopatic | 705/59 |
| 2003/0009570 A1 | 1/2003 | Moskowitz et al. | |
| 2003/0033254 A1 | 2/2003 | Tanaka | |
| 2003/0046407 A1 | 3/2003 | Erickson et al. | |
| 2003/0196091 A1* | 10/2003 | Raley et al. | 713/176 |
| 2004/0064380 A1 | 4/2004 | Hiratsuka | |
| 2004/0152477 A1* | 8/2004 | Wu et al. | 455/466 |
| 2004/0243521 A1* | 12/2004 | Kan | 705/76 |

FOREIGN PATENT DOCUMENTS

| | | |
|---|---|---|
| CN | 1497486 A | 5/2004 |
| EP | 1286515 A2 | 2/2003 |
| FR | 2847753 A1 | 5/2004 |
| JP | 2002073862 A | 3/2002 |
| JP | 2002297597 A | 10/2002 |
| JP | 2003303247 A | 10/2003 |
| JP | 2004013493 A | 1/2004 |
| JP | 2004094850 A | 3/2004 |
| KR | 2003-0079378 A | 10/2003 |
| KR | 2004-0017223 | 2/2004 |
| WO | 2004/079530 A2 | 9/2004 |

OTHER PUBLICATIONS

Japanese Office Action for Japanese Patent Application No. 2007-544719, dated Dec. 8, 2009, and English translation thereof.
Korean Office Action for Korean Patent Application No. 10-2007-7015547, dated Nov. 29, 2008 and partial English translation thereof.
Korean Office Action for Korean Patent Application No. 10-2007-7015547, dated May 29, 2009, and partial English translation thereof.
Japanese Office Action for Application No. 2007-544719 dated Sep. 13, 2010, and its English translation thereof.
Japanese Decision of Rejection for Application No. 2007-544719 dated May 17, 2011, and its English translation thereof.
Japanese Official Inquiry for Application No. 2007-544719 dated Jun. 4, 2012. and its English translation thereof.
Extended European Search Report for Application No. 05818651.1 dated Jul. 25, 2013.

* cited by examiner

METHOD, SYSTEM AND SERVER FOR MANAGING DATA TRANSMISSION

FIELD OF THE TECHNOLOGY

The present invention relates generally to data processing and transmission technologies, and more particularly, to method, system and server for managing data transmission.

BACKGROUND OF THE INVENTION

Along with the development of information technology, the Internet has entered into the people's work, study and life, and brought great advantages for people's communication. Generally, a network system consists of servers and clients.

Refer to FIG. 1 which is a schematic diagram illustrating a network system. The system consists of server 910, a first client 920 and a second client 930; wherein, the first client 920 and the second client 930 both have a data channel with Server 910, the first client 920 may also directly exchange data with the second client 930.

In a network system, a user usually identifies itself using some manners, for example an image provided by an instant communication system. This image for indicating a user identity is also called a head-image.

Refer to FIG. 2 which illustrates a conventional method described for providing a user with a head-image. The method comprises the following steps:

Step S100: a server sends to a first client and a second client a series of fixed images which are displayed to users for choosing an image;

Step S110 and Step S120: the first client and the second client save the fixed image sequence respectively.

Step S111: the user of the first client selects an image as its head-image from the series of images provided;

Step S112: the first client sends the head-image setting information (an image index number) to the server;

Step S113: the server saves the head-image setting information.

When a user of the second client views the user information of the first client, Step S121 is performed, i.e. the second client sends a request to the server for the user head-image index information, i.e. the head-image setting information, of the first client;

Step S122: the server receives and resolves the request information;

Step S123: the server sends the user head-image setting information to the second client;

Step S124: the second client displays a corresponding image according to the head-image setting information.

In this method, the server provides a series of fixed images, and a user only can select a favorable one from such images as his head-image, which impacts experience of the user. Along with the deployment of network communication, fixed system head-images are unable to meet requirements increasingly.

FIG. 3 illustrates the conventional method for implementing a personalized head-image. Referring to FIG. 3, when a first client communicates with a second client, the method includes the following steps:

Step S211: user of the first client selects his personalized head-image which is directed to an image taken by a user using a digital camera or found from the Internet, selected by a user.

Step S212: the first client notifies the second client the head-image is changed by sending a head-image change message.

Step S213: the second client receives and resolves the head-image change message.

Step S214: the second client requests the first client to send an image file of the changed head-image.

Step S215: upon receiving the head-image file request of the second client, the first client sends an image file to the second client.

Step S216: the second client changes and displays the head-image of the opposing party according to the received image.

since a user selects a personalized image optionally, the selected image file may infringe others' intellectual property rights (for example the rights of copyright); and since the image file is transmitted between clients in a Point-to-Point (P2P) manner, it is difficult for the network system to determine whether the image selected by the user has infringed others' intellectual property rights, which makes it impossible to protect the intellectual property rights of image file effectively. The same problem also occurs in the embodiment as shown in FIG. 2, since a series of fixed images are saved in the client in the embodiment as shown in FIG. 2 and the server side only manages the index of image, the server is unable to manage the propagation path of images and to determine whether the image selected by the user has infringed others' intellectual property rights, which makes it impossible to protect the intellectual property rights of image file effectively.

Likewise, it is impossible to protect the intellectual property rights effectively when other data, for example ring tone, music, literature to be protected by the intellectual property rights, are transmitted between clients of network system in P2P manner.

SUMMARY OF THE INVENTION

Embodies of the present invention provide method, system and server for managing data transmission, which may control the propagation path of personalized data effectively.

The technical scheme of the technical problem solved by the present invention is given as follows.

A method for managing data transmission includes:

requesting, by a client, a server for data update;

resolving, by the server, the request of client, taking control measurement to the data that the client requests to be updated according to a predetermined control policy, and determining whether the data that the client requests to be updated meet the control policy;

if the the data that the client requests to be updated meet the control policy, notifying, by the server, the client of updating data;

updating, by the client, the data.

A system for managing data transmission includes a server and client; a data channel is set between the server and the client; the server is used for resolving the data update request of client, performing the control measure for the data requested by the client to update according to a predetermined control policy, and allowing the client for update the data after the data requested by the client for update meets the control policy.

A server for managing data transmission, comprising:

a database for storing the control policy data;

a data type determination unit for determining the data type requested by the client for update and the corresponding control policy condition.

In comparison with the conventional technologies, the advantageous effects of the present invention is that, since the server takes a managing measurement for the updated data according to a predetermined control policy in accordance with the present invention, it is possible to control the data requested for updating uniformly by means of a unified central control notification mode, which may effectively control the propagation path of personalized data, and makes a good effect of intellectual property rights protection.

In preferred embodiments of the present invention, a server detects the condition for managing the data requested by a client for update, and prompts the client to pay the fees when the infringement may occurs, so as to control the propagation path of data and provide an effective intellectual property rights protection measurement. According to the embodiments of the present invention, the network system can determine whether such data as ring tone, music, literature selected by user has infringed others' intellectual property rights easily. Thus, the propagation path of data can be effectively controlled, which helps to protect the intellectual property rights effectively.

DETAILED DESCRIPTION OF THE INVENTION

Figure 1:
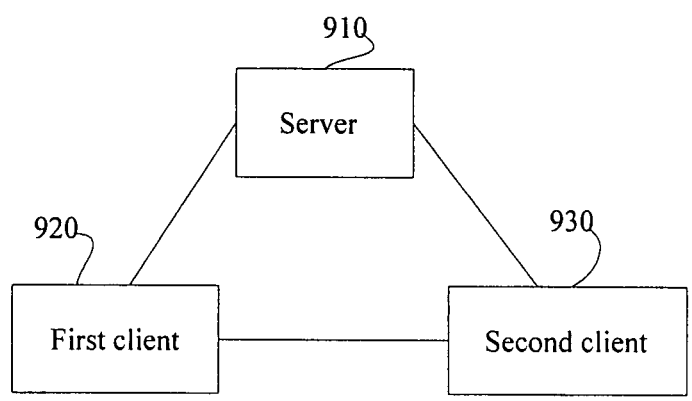
FIG. 1 is a schematic diagram illustrating a network system.
Figure 2:
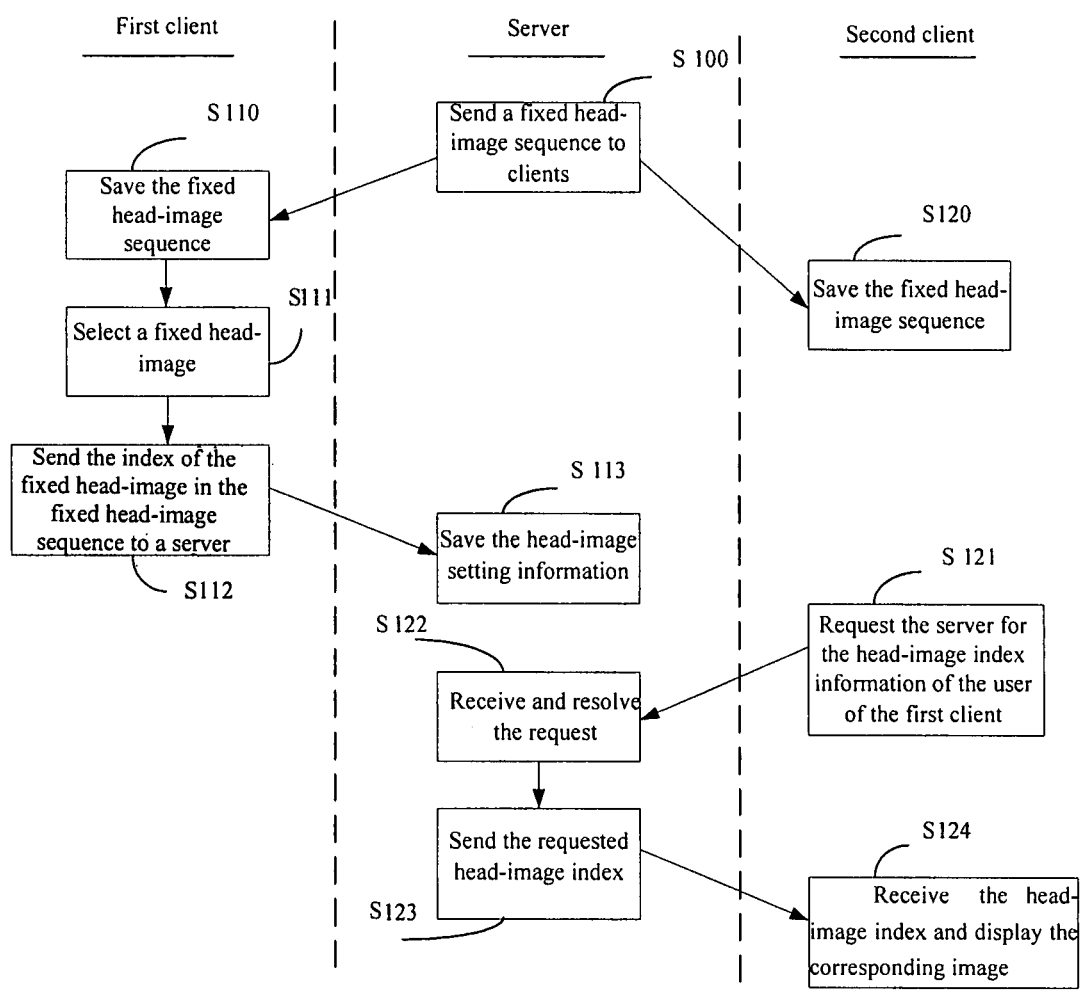
FIG. 2 is a diagram illustrating a conventional method for providing a user with a head-image.
Figure 3:
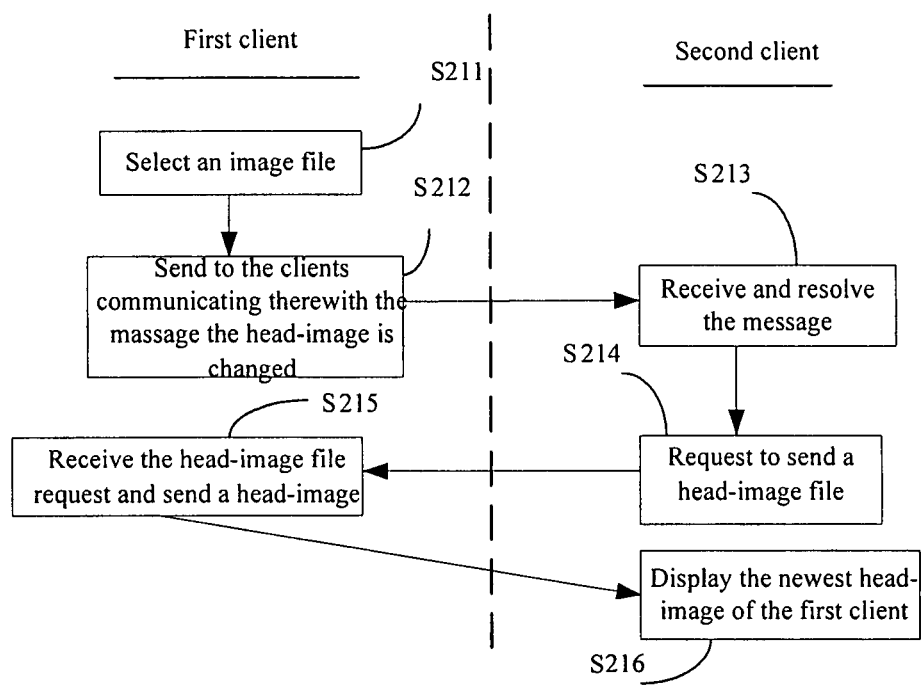
FIG. 3 is a diagram illustrating a conventional method for implementing a personalized head-image.
Figure 4:
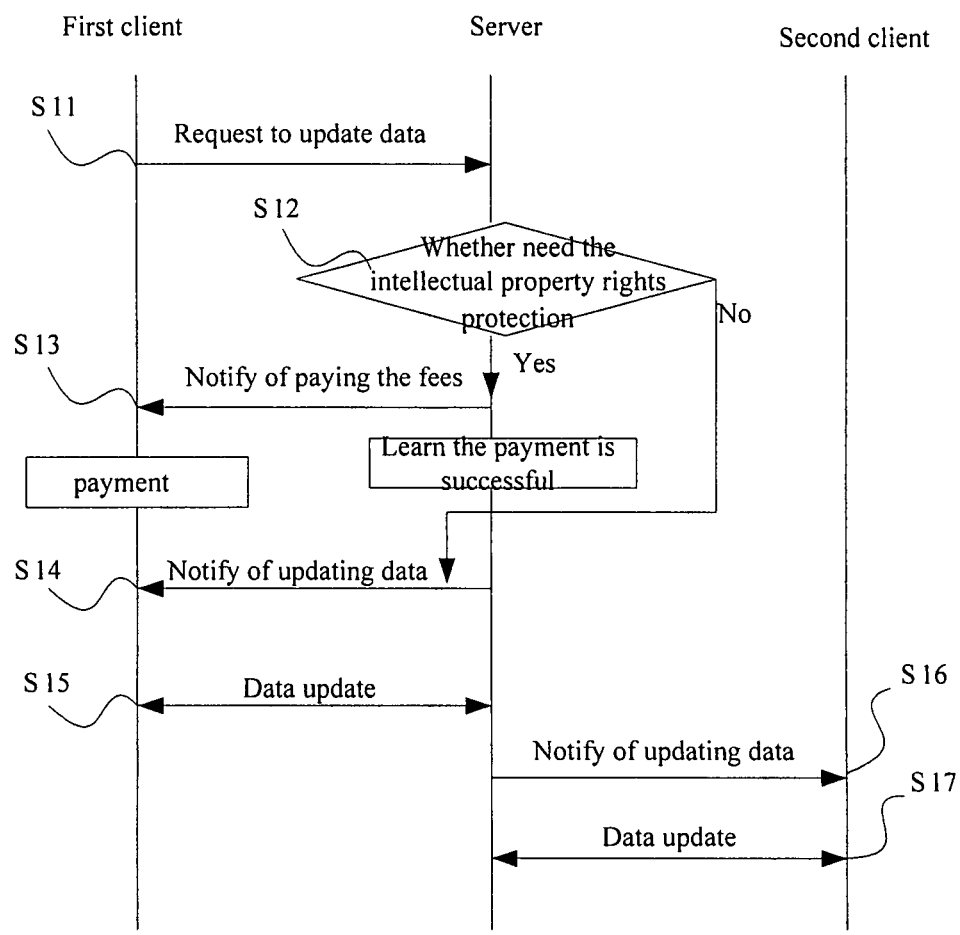
FIG. 4 is a flowchart illustrating the method for managing a data transmission in accordance with the present invention.

Referring to FIG. 4, the method for managing a data transmission in accordance with the present invention is as follows.

Step S11: a first client requests a server to update data.

In the present invention, the data may be such literatures as an image file, ring tone, music that may be protected by the intellectual property rights; the request data update may includes: a first client selecting data from the data sequence provided by a server, and sending the selected result to the server or the first client requesting to upload its selected personalized data, which may be the data selected by the first client in other manners, for example a personalized picture downloaded from the Internet, to the server. A data control policy is predetermined in the server in accordance with the present invention, for example a control policy for protecting the intellectual property rights of data or a payment control policy of charging service data.

Step S12: the server resolves the request of the first client, and determines whether the data need to be controlled according to a predetermined control policy. If so, proceed to Step S13; otherwise, proceed to Step S14.

When the control policy is a protection control policy of intellectual property rights, the detailed determination procedure may includes: determining whether the intellectual property rights of the data requested by the first client is protected; if so, determining whether the request of the client is granted by the patentee who has the intellectual property rights of the requested data; if the request of the client is not granted by the patentee who has the intellectual property rights of the requested data, performing a control measure; otherwise, not need a control measure; the control measure herein mainly includes: notifying the client of obtaining the permission given by the patentee who has the intellectual property rights of the data, allowing the client to update the data after obtaining the client is granted; alternatively, notifying the client of paying the corresponding fees, and allowing the client to update the data after learning the fees is paid successfully, which is shown in the following data update procedure.

When the control policy is a payment control policy, the detailed determination procedure may include: determining whether the data selected by the first client are the data of charging service; if so, performing a control policy; otherwise, not need a control policy. The control policy herein mainly includes: notifying the client of paying the corresponding fees, and allowing the client to update the data after learning the fees is paid successfully, which is shown in the following data update procedure.

Step S13: the server notifies the first client of paying the fees for using the data. Proceed to Step S14 after the server learns the fees are paid successfully.

The payment manner of fees may include various technical measures, for example cash payment and network payment; the path for the server learning whether the payment is successful may include learning from the patentee of intellectual property rights or accepting the network payment of the client, which will not be further described herein.

Step S14: the server notifies the first client of updating data;
Step S15 the first client updates the data.

The data update specifically includes: downloading, by the first client, the data from the server or uploading the data to the server.

Step S16: the server notifies the second client that the first client has updated its data.

Step S17: the second client obtains the updated data.

The detailed obtaining step may include: downloading, by the second client, the data from the server or requesting the first client to send the data.

Figure 5:
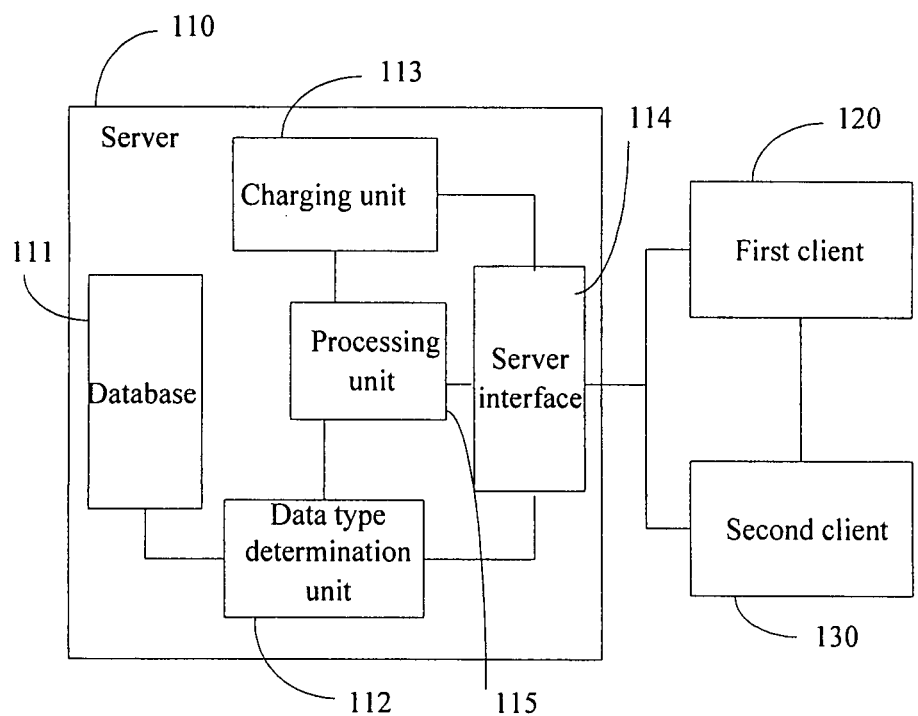
FIG. 5 is a block diagram illustrating the system for managing a data transmission in accordance with the present invention.

Referring to FIG. 5, in the system of the present invention, server 110 has respective data channels with a first client 120 and a second client 130; the first client 120 may directly exchange data with the second client 130.

Server 110 consists of database 111, data type determination unit 112, charging unit 113, server interface 114 and processing unit 115. The database 111 is used for storing control policy data; the data type determination unit 112 is used for determining the condition of data type and control policy (for example a protection strategy of intellectual property rights or a payment control policy), which a client requests for update; the charging unit 113 is used for constructing a data payment prompt message, sending the message to a client, and confirming the payment result; the processing unit 115 of server 110 determines the data requested by a client for update meets a control policy after the charging unit 113 confirms the payment is successful; the server interface 114 is used for establishing a data channel with a client; the processing unit 115 is used for harmonizing the work of other units, performing a control policy for the data requested by the client according to the determined result of data type determination unit 112 and a predetermined control policy, and allowing the client for data update to support the data processing and transmission after determining the data requested by the client for update meeting the control policy.

In order to understand the present invention conveniently, the method of the present invention is hereinafter described with respect to embodiments.

Figure 6:
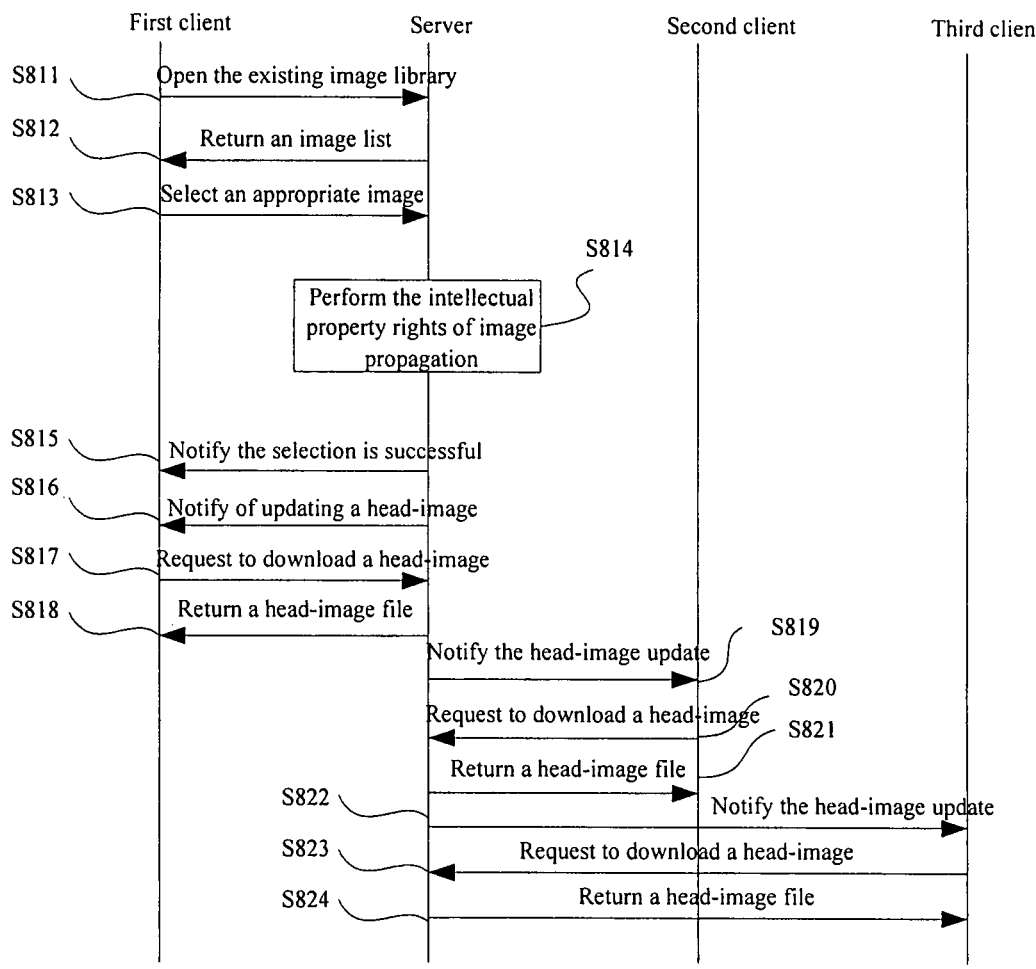
FIG. 6 is a flowchart of the first embodiment in accordance with the present invention.

FIG. 6 illustrates a first embodiment of the present invention. The description is given in the first embodiment of the present invention supposing the intellectual property rights protection is implemented when a user of instant communication system changes an image.

Step S811: a first client sends a request message to request a server to open its existing image library.

Step S812: the server resolves and processes the request message, and returns the existing image list to the first client.

Step S813: the first client displays the received image list to a user, and sends the selected image information to the server after the user selects an appropriate image.

Step S814: the server determines whether the selected image is protected by intellectual property rights; if so, prompts the first client to pay the corresponding fees; after receiving the prompt message sent by the server, the first client pay the corresponding fees for the patentee of intellectual property rights; after the server confirms the fees are paid, proceeds to Step S815; if the selected image is not protected by intellectual property rights or the first client is granted by the patentee who has the intellectual property rights of the image (for example the request includes a permissible identifier), proceeds to Step S815 directly.

Step S815: the server sends to the first client a notification indicating selection is successful.

Step S816: the server notifies the first client of updating an image.

Step S817: after receiving the above message, the first client requests the server to download the selected head-image.

Step S818: the server returns the requested head-image to the first client.

Step S819: the server sends a notification message to notify the second client that the head-image of the first client is changed.

Step S820: the second client requests the server to download the head-image updated by the first client.

Step S821: the server returns the requested head-image to the second client.

At the same time, the head-image update notification and download procedure between the server and the third client is similar to that between the server and the second client, which is as shown by Step S822 to Step S824 and will not be further described herein.

Figure 7:
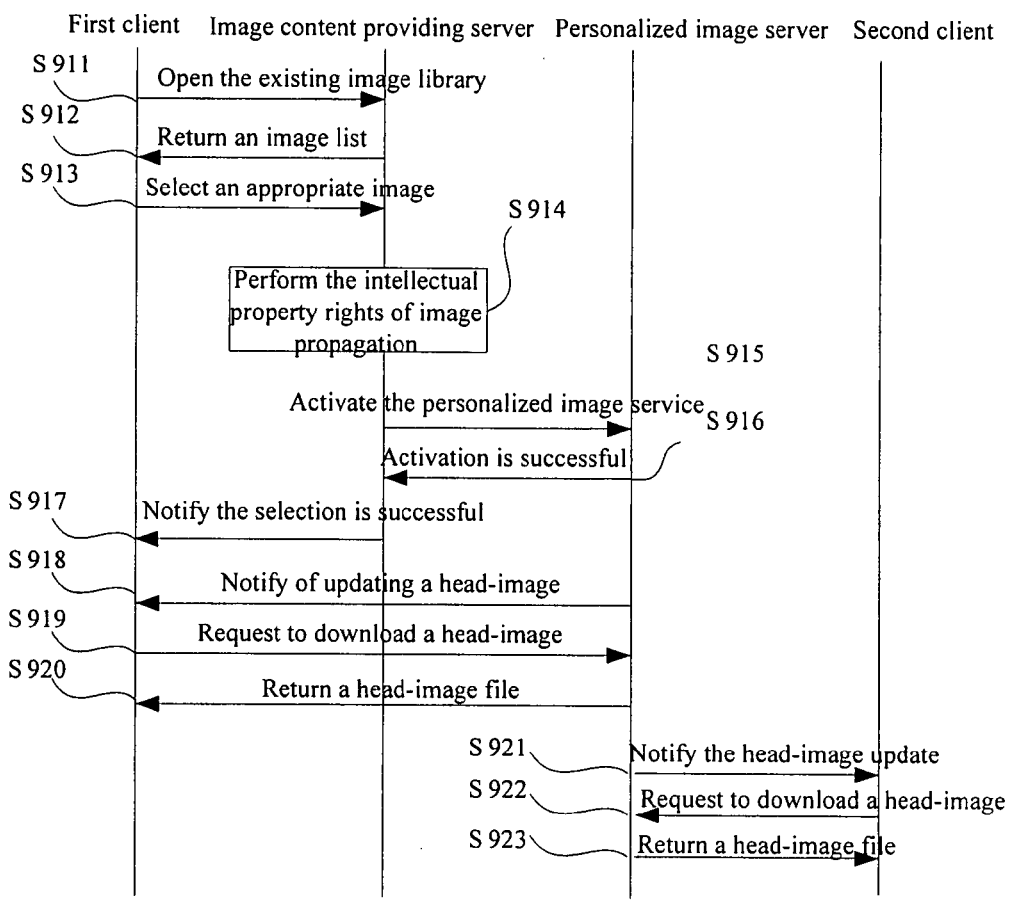
FIG. 7 is a flowchart of the second embodiment in accordance with the present invention.

FIG. 7 illustrates a second embodiment of the present invention.

In this embodiment, the server includes an image content providing server and a personalized image server; the image content providing server is used for performing the intellectual property rights protection measure including: determining the image type, and determining whether the user has paid the corresponding fees; the personalized image server is used for notifying a client of updating the data.

Step S911: a first client sends a request message to request an image content providing server to open its existing image library.

Step S912: the image content providing server resolves and processes the request message, and returns the image list of the existing image library to the first client.

Step S913: the first client displays the received image list to a user, and sends the selected image information to the image content providing server after the user selects an appropriate image.

Step S914: the image content providing server determines whether the selected image is protected by intellectual property rights; if so, prompts the first client to pay the corresponding fees; after receiving the prompt message sent by the image content providing server, the first client pay the corresponding fees for the patentee of intellectual property rights; after the image content providing server confirms the fees are paid, proceeds to Step S915; if the selected image is not protected by intellectual property rights or the first client is granted by the patentee who has the intellectual property rights of the image (for example the request includes a permissible identifier), proceeds to Step S915 directly.

Step S915: the image content providing server sends a message to the personalized image server to activate the user of the first client for using the selected image.

Step S916: the personalized image server returns a successful activation message to the image content providing server.

Step S917: the image content providing server notifies the first client the selection is successful.

Step S918: the personalized image server notifies the first client of updating an image.

Step S919: after receiving the above message, the first client requests the personalized image server to download the selected head-image.

Step S920: the personalized image server returns the requested head-image to the first client.

Step S921: the personalized image server sends a message to notify the second client that the head-image of the first client is changed.

Step S922: the second client requests the personalized image server to download the head-image updated by the first client.

Step S923: the personalized image server returns the requested head-image to the second client.

In addition, the server may also determine the user identity of the first client and perform the corresponding charging, for example dividing users into monthly payment users and time based charging users; if the user is a monthly payment user, the server may determine this user has paid the fees, and allow the user to perform the subsequent update data procedure; if the user is a time based charging user, the server needs to determine whether the requested data need the user to pay the fees; if so, performs the subsequent update data procedure after the user pays the fees.

In addition, in the above Step S913, the image selected by the first client may also be a personalized image acquired by the first client through other paths, for example an image downloaded from the Internet or a picture taken by a digital camera; herein, the first client uploads the selected personalized image to the image content providing server, and performs the subsequent Step S914; after the payment is successful, the image content providing server activates the personalized image server for the first client using the personalized image service; the image content providing server sends the personalized image of the first client to the personalized image server; the personalized image server notifies the second client of updating the data. The detailed update procedure of the second client includes: obtaining the personalized image from the personalized image server or directly obtaining the personalized image from the first client.

To sum up, in the present invention, the server of system controls the propagation path of personalized images using a central control notification mode, so as to prevent the illegal propagation of the personalized image which infringes others' intellectual property rights to a certain extent.

It should be noted that, the present invention is not limited to the image propagation in an instant communication system. For example, other files like voice and video multimedia information; at this point, the image content providing server may be referred to as a data content providing server while the personalized image server may be referred to as a personalized data server.

It is should be further described that, the solution of the present invention may be applicable to the personalized ring tone propagation of terminals in a mobile communication system, for example a user uses a personalized music as the other party's ring back tone; alternatively, the solution of the present invention may be applicable to a terminal of mobile communication system regards an image as the other party's incoming call display identifier, which will not be further described herein.

The forgoing is only preferred embodiments of the present invention. It is should be noted that, several improvement and modification made by those skilled in the prior art without departing from the principle of the present invention should be covered in the protection scope of the present invention.

The invention claimed is:

1. A method for managing data transmission, comprising:
    resolving, by an image content providing server, a request sent from a client terminal for updating data;
    determining, by the image content providing server, whether the data are protected by rights of copyright;
    determining, by the image content providing server, whether the request for updating the data is permitted by a patentee who possesses the rights of copyright if the data are protected by the rights of copyright;
    informing, by the image content providing server, the client terminal to pay fees for the data protected by the rights of copyright if the request for updating the data is not permitted by the patentee who possesses the rights of copyright;
    sending, by the image content providing server, a message to a personalized image server to inform the personalized image server of performing an activation operation to allow the client terminal to use the data;
    performing, by the personalized image server, the activation operation to allow the client terminal to use the data;
    sending, by the personalized image server, an successful activation message indicating that the activation operation is successful;
    informing, by the personalized image server, the client terminal to update the data.

2. The method for managing data transmission of claim 1, wherein the method further comprises:
    informing, by the personalized image server, a second client terminal performing instant communication with the client terminal that the data of the client terminal has been updated; and
    obtaining, by the second client terminal, the data updated by the client terminal.

3. The method for managing data transmission of claim 2, further comprising:
    downloading, by the client terminal, the data from the personalized image server;
    wherein obtaining, by the second client terminal, the data updated by the client terminal comprises:
    downloading, by the second client terminal, the data selected by the client terminal from the personalized image server, or receiving, by the second client terminal, the data selected by the client terminal from the client terminal.

4. The method for managing data transmission of claim 2, further comprising:
    requesting, by the client terminal, to upload the data selected by the client terminal to the image content providing server;
    sending, by the image content providing server, the data to the personalized image server,
    wherein obtaining, by the second client terminal, the data updated by the client terminal comprises:
    downloading, by the second client terminal, the data uploaded by the client terminal from the personalized image server, or receiving the data from the client terminal.

5. The method for managing data transmission of claim 1, wherein the data comprises:
    image, music, ring tone or video multimedia information.

6. A system for managing data transmission, comprising:
    a server and a client terminal; wherein the server comprises: an image content providing server and a personalized image server;
    a data channel is set between the server and the client terminal; and
    the image content providing server is configured to resolve a request sent from a client terminal for updating data, determine whether the data are protected by rights of copyright, and determine whether the request for updating the data is permitted by a patentee who possesses the rights of copyright if the data are protected by the rights of copyright, inform the client terminal to pay fees for the data protected by the rights of copyright if the request for updating the data is not permitted by the patentee who possesses the rights of copyright, send a message to the personalized image server to inform the personalized image server of performing an activation operation to allow the client terminal to use the data;
    the personalized image server is configured to perform the activation operation to allow the client terminal to use the data, send an successful activation message indicating that the activation operation is successful and inform the client terminal to update the data.

7. The system for managing data transmission of claim 6, wherein the server comprises:
    an instant communication server; and
    the client terminal is one of client terminals performing instant communication with each other.

8. The system for managing data transmission of claim 6, further comprising: a second client terminal;
    wherein the personalized image server is further configured to inform the second client terminal performing instant communication with the client terminal that the data of the client terminal has been updated;
    the second client terminal is configured to obtain the data updated by the client terminal.

9. The system for managing data transmission of claim 8, wherein the client terminal is further configured to request to upload the data selected by the client terminal to the image content providing server;
    the second client terminal is further configured to download the data uploaded by the client terminal from the personalized image server or receive the data from the client terminal.

* * * * *